United States Patent
Kwon

(10) Patent No.: US 12,454,305 B2
(45) Date of Patent: Oct. 28, 2025

(54) STEER BY WIRE TYPE STEERING APPARATUS

(71) Applicant: HL MANDO CORPORATION, Gyeonggi-do (KR)

(72) Inventor: HyunBi Kwon, Gyeonggi-do (KR)

(73) Assignee: HL MANDO CORPORATION, Gyeonggi-do (KR)

(*) Notice: Subject to any disclaimer, the term of this patent is extended or adjusted under 35 U.S.C. 154(b) by 869 days.

(21) Appl. No.: 17/681,841

(22) Filed: Feb. 28, 2022

(65) Prior Publication Data

US 2022/0281515 A1    Sep. 8, 2022

(30) Foreign Application Priority Data

Mar. 3, 2021  (KR) .................. 10-2021-0027962

(51) Int. Cl.
B62D 5/04        (2006.01)

(52) U.S. Cl.
CPC ......... *B62D 5/0445* (2013.01); *B62D 5/0409* (2013.01); *B62D 5/0469* (2013.01); *B62D 5/0475* (2013.01)

(58) Field of Classification Search
CPC .. B62D 5/0445; B62D 5/0409; B62D 5/0469; B62D 5/0475
See application file for complete search history.

(56) References Cited

U.S. PATENT DOCUMENTS

| | | | |
|---|---|---|---|
| 5,456,330 A | 10/1995 | Kojima et al. | |
| 8,657,062 B2* | 2/2014 | Tashiro | B62D 5/003 180/443 |
| 8,662,240 B2* | 3/2014 | Higashi | B62D 15/0215 180/402 |
| 8,869,930 B2* | 10/2014 | Ishihara | B62D 15/0215 701/43 |
| 11,168,768 B1* | 11/2021 | Israr | G06F 3/016 |
| 11,204,082 B2* | 12/2021 | Bonkowski | B62D 5/001 |
| 12,037,056 B2* | 7/2024 | Kim | B62D 5/0445 |

(Continued)

FOREIGN PATENT DOCUMENTS

| | | |
|---|---|---|
| CN | 103171617 | 6/2013 |
| CN | 103287485 | 9/2013 |

(Continued)

OTHER PUBLICATIONS

Office Action dated Dec. 27, 2024 for Chinese Patent Application No. 202210202726.8 and its English translation provided by Applicant's foreign counsel/Google Translate.

(Continued)

*Primary Examiner* — Minnah L Seoh
*Assistant Examiner* — Michael R Stabley
(74) *Attorney, Agent, or Firm* — WOMBLE BOND DICKINSON (US) LLP

(57) ABSTRACT

The present embodiments may provide a steer by wire type steering apparatus including a screw shaft rotating in conjunction with the steering shaft, a moving member coupled to an outer circumferential side of the screw shaft and moving in the axial direction when the screw shaft rotates, a housing in which the screw shaft and the moving member are embedded, and a guide member coupled to the housing to support the moving member and guide the axial movement of the moving member.

20 Claims, 11 Drawing Sheets

(56) References Cited

U.S. PATENT DOCUMENTS

| | | |
|---|---|---|
| 2013/0161116 A1 | 6/2013 | Tashiro |
| 2013/0220725 A1* | 8/2013 | Ishihara |
| 2018/0238377 A1* | 8/2018 | Kim .................... B62D 6/10 |
| 2019/0291776 A1 | 9/2019 | Shin et al. |
| 2021/0129898 A1 | 5/2021 | Forte et al. |
| 2021/0222759 A1* | 7/2021 | Bonkowski ............ B62D 5/001 |
| 2022/0234649 A1* | 7/2022 | Kim .................... B62D 5/0445 |
| 2022/0379949 A1 | 12/2022 | Cho |

FOREIGN PATENT DOCUMENTS

| | | |
|---|---|---|
| CN | 108516011 | 9/2018 |
| CN | 110304131 | 10/2019 |
| CN | 110505994 | 11/2019 |
| CN | 210310538 U | 4/2020 |
| CN | 115402398 | 11/2022 |
| JP | 2017-82918 | 5/2017 |
| KR | 10-2011-0062630 | 6/2011 |
| KR | 10-2173997 | 11/2020 |
| WO | 2020/184883 | 9/2020 |

OTHER PUBLICATIONS

Office Action dated Feb. 7, 2025 for Korean Patent Application No. 10-2021-0027962 and its English translation provided by Applicant's foreign counsel.

Notice of Allowance dated May 21, 2025 for Chinese Patent Application No. 202210202726.8 and its English translation provided by Applicant's foreign counsel.

\* cited by examiner

STEER BY WIRE TYPE STEERING APPARATUS

CROSS REFERENCE TO RELATED APPLICATION

This application claims priority from Korean Patent Application No. 10-2021-0027962, filed on Mar. 3, 2021, which is hereby incorporated by reference for all purposes as if fully set forth herein.

TECHNICAL FIELD

The present embodiments relate to a steer by wire steering type apparatus, and more particularly, to a steer by wire steering type apparatus capable of mechanically stopping the steering wheel from rotating further when the rotation of the wheel reaches its maximum point, even if an error occurs in the motor or electronic controller, it is possible to provide steering reaction force.

DESCRIPTION OF RELATED ART

In general, power steering has been developed and applied to a vehicle steering apparatus to provide convenience in driving operation by assisting a driver's operating force of a steering wheel. Power steering was developed and applied in hydraulic type using hydraulic pressure, electro-hydraulic type using hydraulic pressure and electric power of the motor at the same time, and electric type using only electric power of the motor.

Recently, instead of removing a mechanical connection device such as a steering column or a universal joint or a pinion shaft between the steering wheel and the wheel, the Steer By Wire (SBW) type steering apparatus for steering a vehicle using an electric motor has been developed and applied.

However, in the case of such a steer by wire type steering apparatus, since there is no mechanical connection between the steering shaft and the wheels, the driver's steering wheel rotation can rotate indefinitely, thereby reducing the driver's steering feeling and steering stability.

In addition, in the steer by wire type steering apparatus, when a malfunction or inability of a motor or an electronic controller occurs, a steering reaction force cannot be generated, thereby deteriorating the driver's steering feel and steering stability.

Therefore, when the rotation of the wheel reaches the maximum point (when the steering wheel or the wheel is in a full-turn state in a general steering apparatus), the steering wheel is prevented from rotating any more, and even if an error occurs in the motor or electronic controller, there is a need for research to prevent the driver's steering feeling and steering stability from being degraded.

BRIEF SUMMARY

The present embodiments may provide a steer by wire type steering apparatus capable of increasing a driver's steering feel and steering stability by preventing the steering wheel from mechanically rotating any more when the rotation of the wheel reaches the maximum point.

In addition, the present embodiments may provide a steer by wire type steering apparatus capable of increasing the driver's steering feel and steering stability by generating a physical steering reaction force even when a malfunction or inability of a motor or electronic controller occurs.

In addition, the objects of the present embodiments are not limited thereto, and other objects not mentioned will be clearly understood by those skilled in the art from the following description.

According to an aspect, the present embodiments provide a steer by wire type steering apparatus including a screw shaft having an outer circumferential screw portion provided on an outer circumferential surface and rotating in conjunction with the steering shaft, a moving member coupled to an outer circumferential side of the screw shaft and having an inner circumferential screw portion screw-coupled to the outer circumferential screw portion formed on the inner circumferential surface and moving in the axial direction when the screw shaft rotates, a housing in which the screw shaft and the moving member are embedded, and a guide member coupled to the housing to support the moving member and guide the axial movement of the moving member.

According to the present embodiments, there may be provided a steer by wire type steering apparatus capable of increasing a driver's steering feel and steering stability by preventing the steering wheel from mechanically rotating anymore when the rotation of the wheel reaches the maximum point.

In addition, there may be provided a steer by wire type steering apparatus capable of increasing the driver's steering feel and steering stability by generating a physical steering reaction force even when a malfunction or inability of a motor or electronic controller occurs.

DETAILED DESCRIPTION

Figure 1:
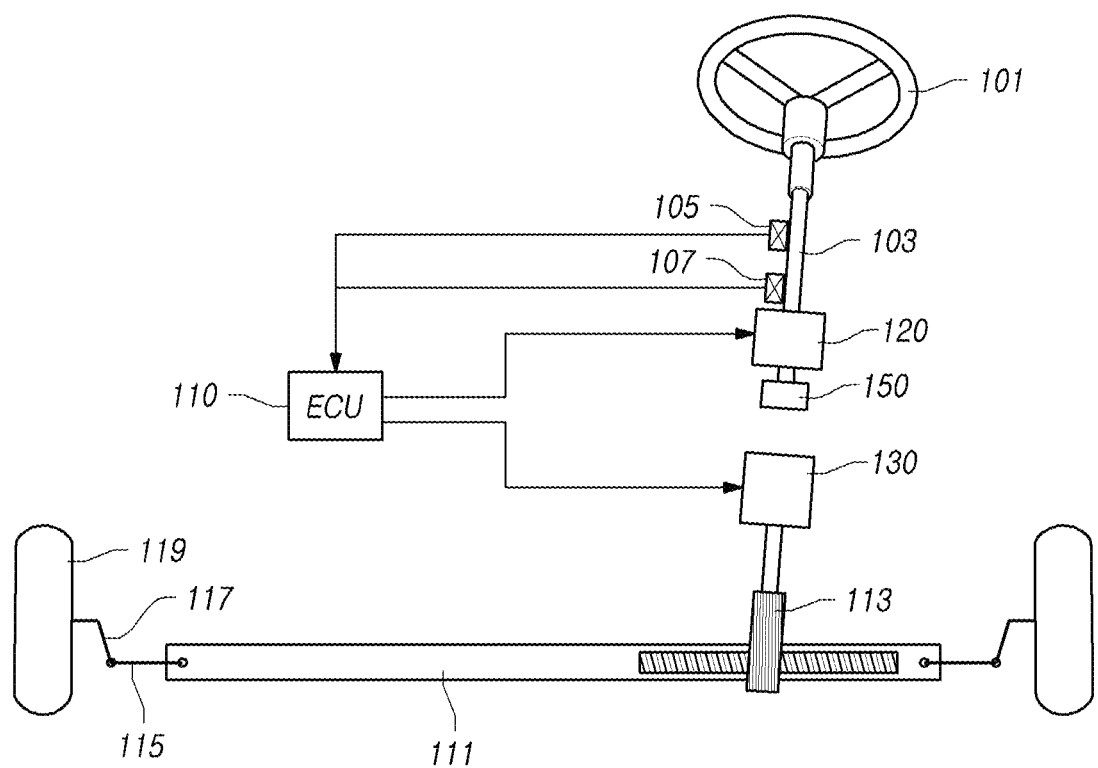
FIG. 1 is a configuration diagram schematically showing a steer by wire type steering apparatus according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
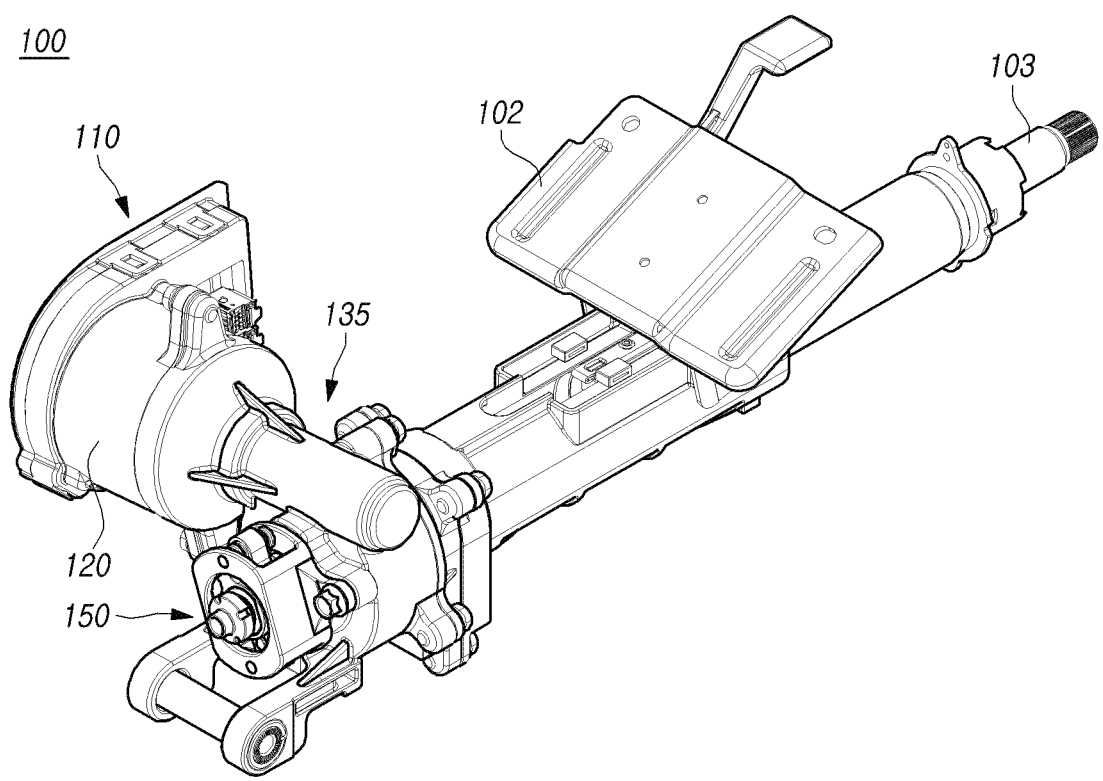
FIG. 2 is a perspective view showing a part of the steer by wire type steering apparatus according to the present embodiments.
Figure 3:
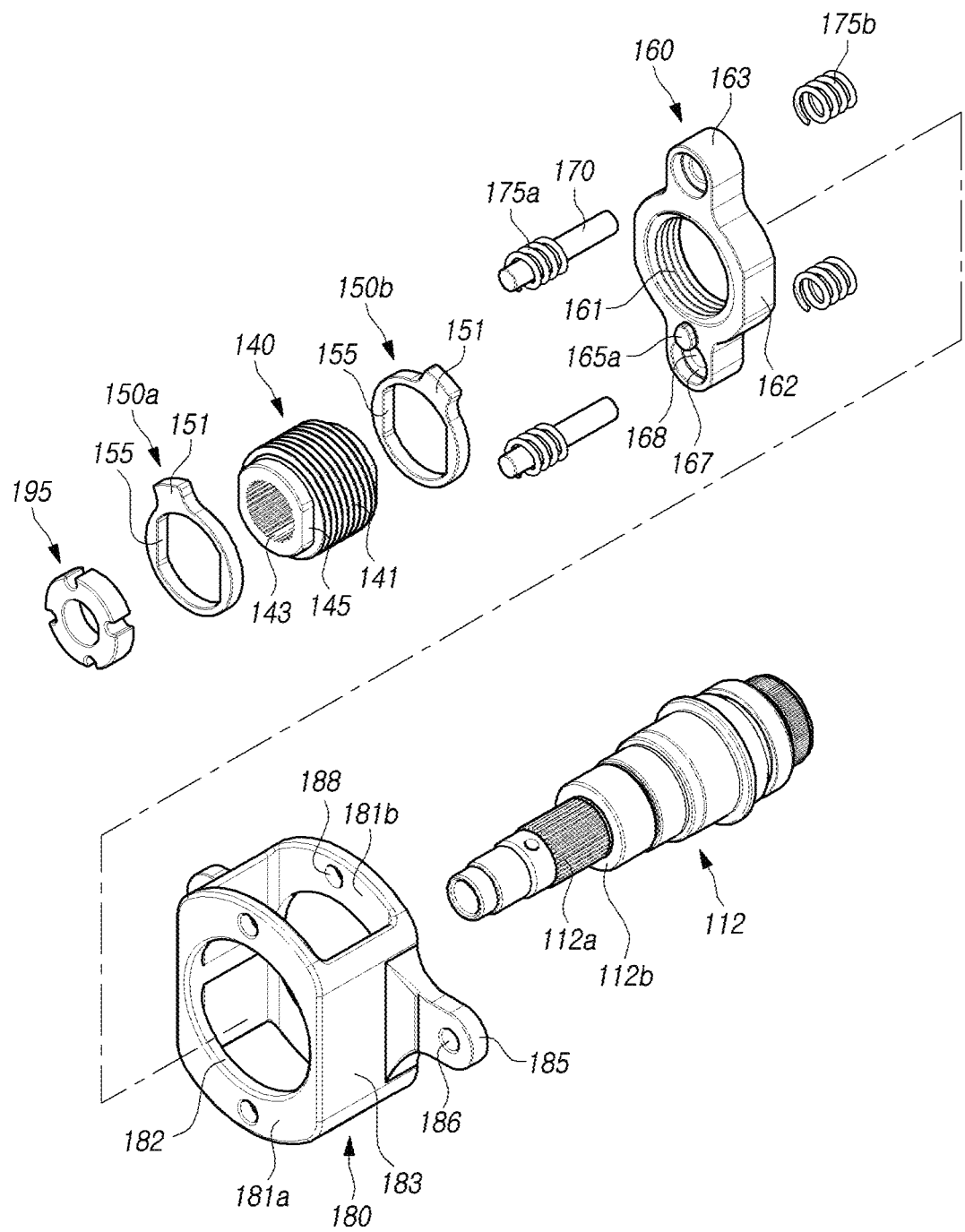
FIGS. 3 and 4 are exploded perspective views showing some of the steer by wire type steering apparatus according to the present embodiments.
Figure 4:
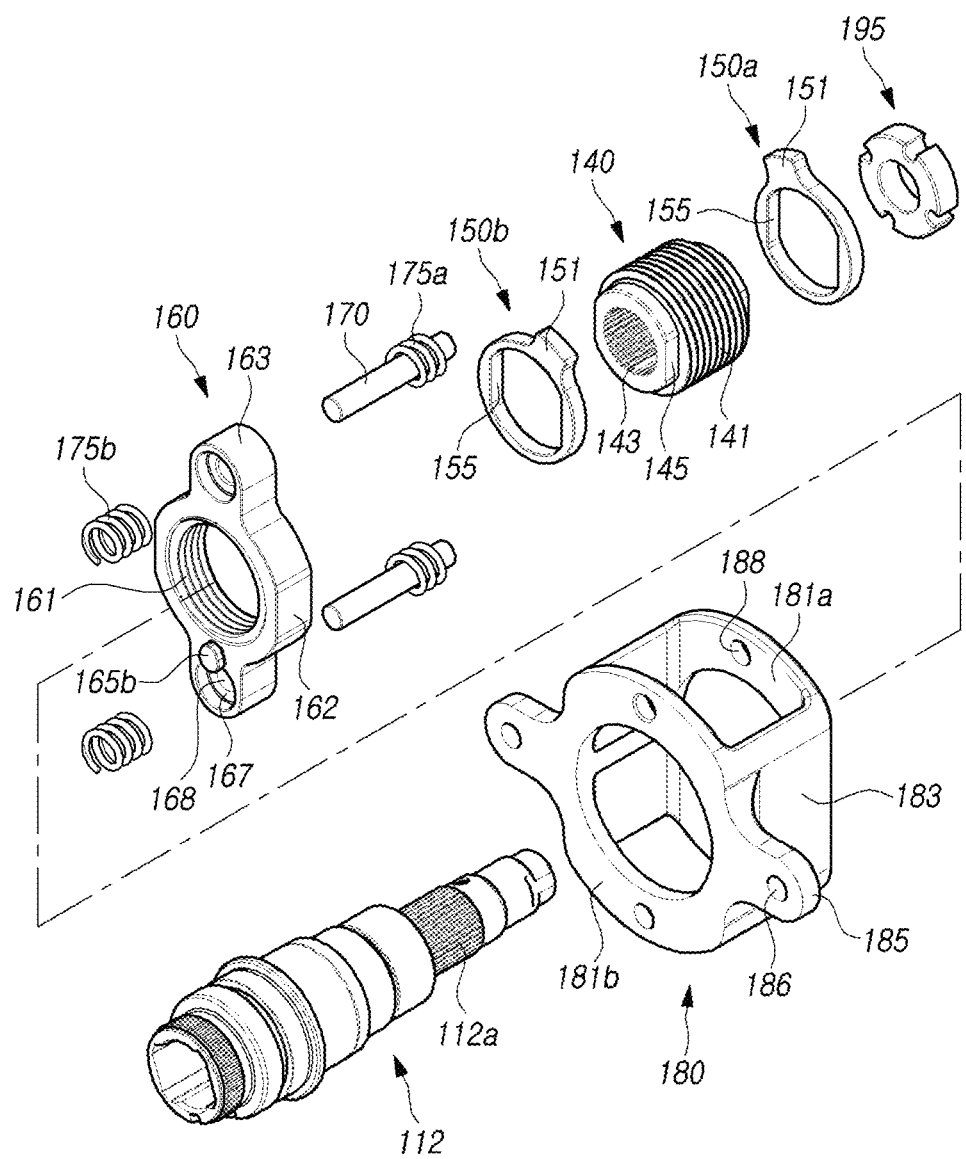
Figure 5:
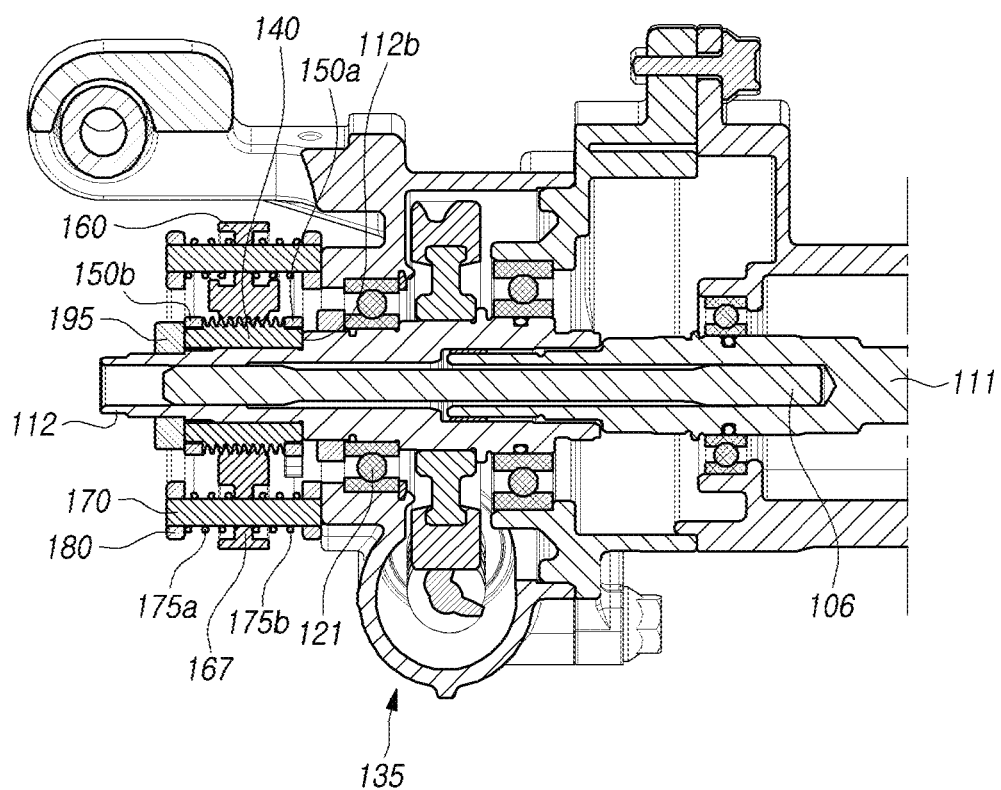
FIG. 5 is a sectional view showing a part of the steer by wire type steering apparatus according to the present embodiments.
Figure 6:
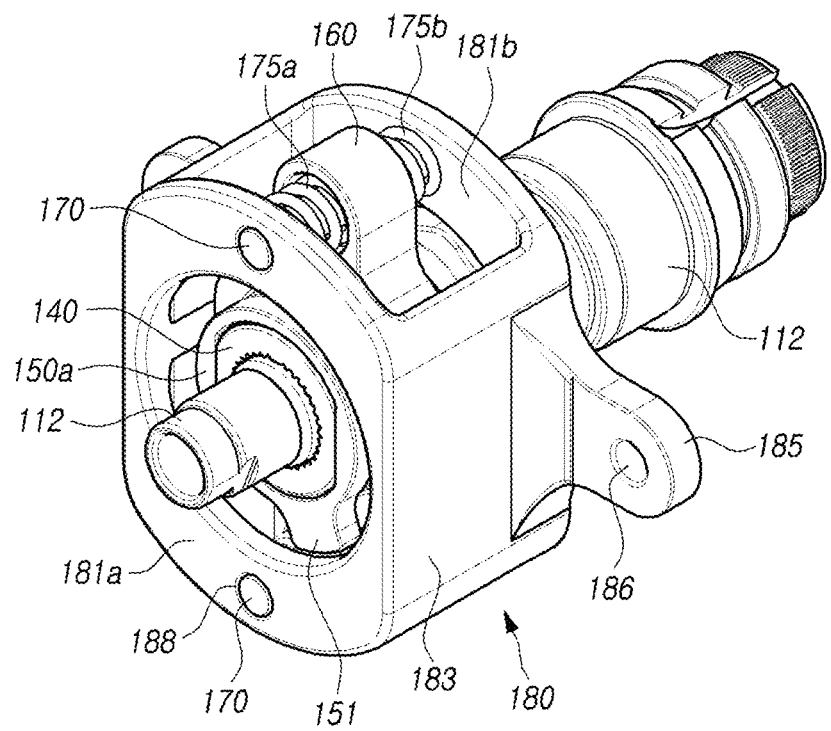
FIGS. 6 and 7 are exploded perspective views showing some of the steer by wire type steering apparatus according to the present embodiments.
Figure 7:
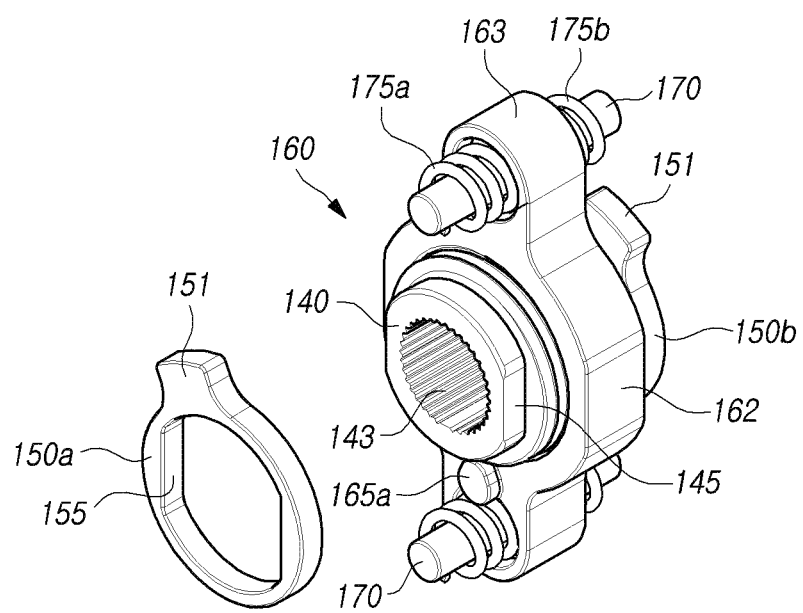
Figure 8:
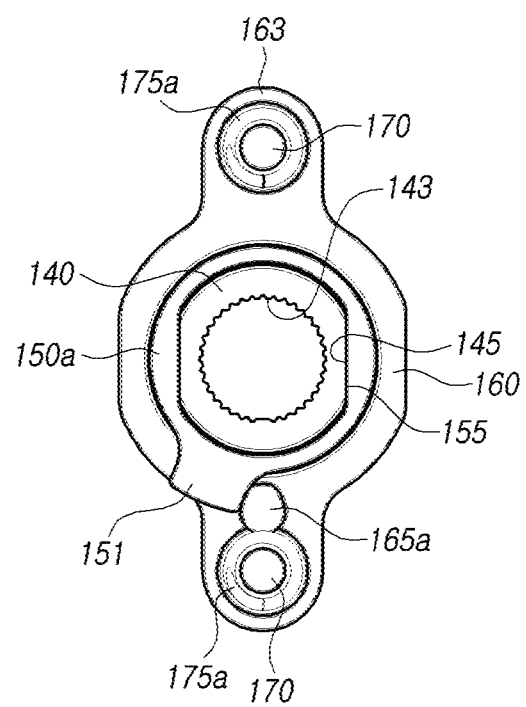
FIG. 8 is a front view showing a part of the steer by wire type steering apparatus according to the present embodiments.
Figure 9:
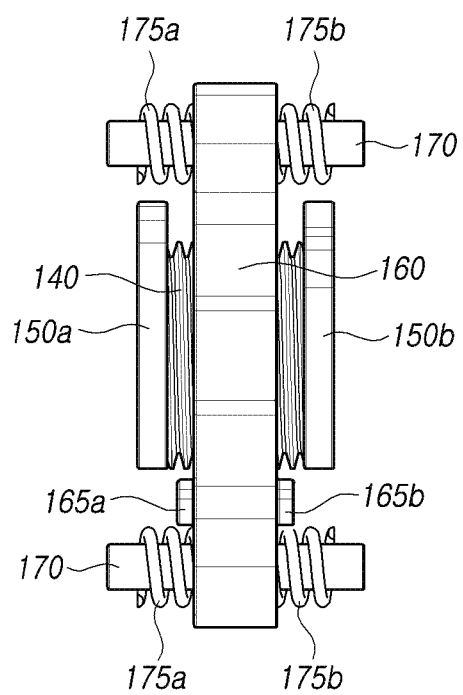
FIGS. 9 to 11 are side views showing some of the steer by wire type steering apparatus according to the present embodiments.
Figure 10:
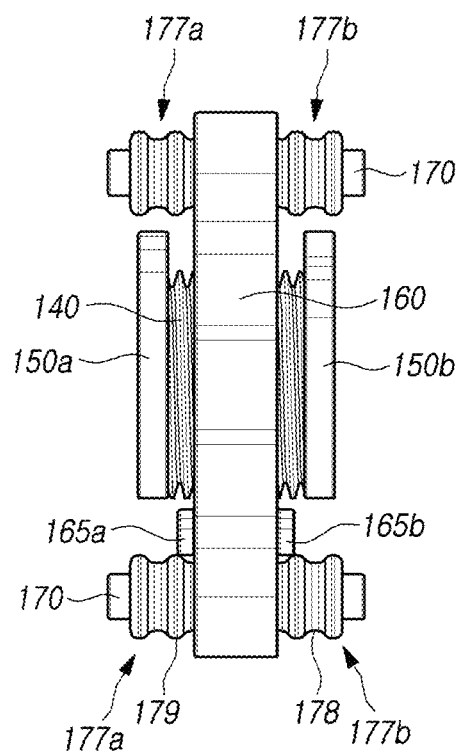
Figure 11:
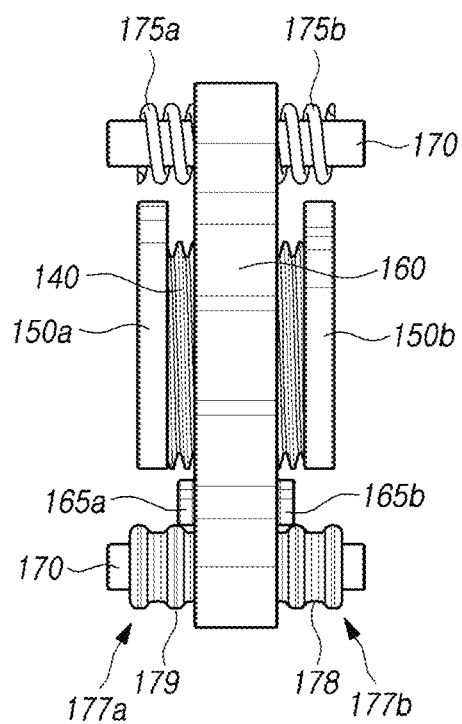

FIG. 1 is a configuration diagram schematically showing a steer by wire type steering apparatus according to the present embodiments. FIG. 2 is a perspective view showing a part of the steer by wire type steering apparatus according to the present embodiments. FIGS. 3 and 4 are exploded perspective views showing some of the steer by wire type steering apparatus according to the present embodiments. FIG. 5 is a sectional view showing a part of the steer by wire type steering apparatus according to the present embodiments. FIGS. 6 and 7 are exploded perspective views showing some of the steer by wire type steering apparatus according to the present embodiments. FIG. 8 is a front view showing a part of the steer by wire type steering apparatus according to the present embodiments. FIGS. 9 to 11 are side views showing some of the steer by wire type steering apparatus according to the present embodiments.

As illustrated in FIGS. 1 to 11, a steer by wire type steering apparatus according to the present embodiments may include a screw shaft having an outer circumferential screw portion provided on an outer circumferential surface and rotating in conjunction with the steering shaft, a moving member coupled to an outer circumferential side of the screw shaft and having an inner circumferential screw portion screw-coupled to the outer circumferential screw portion formed on the inner circumferential surface and moving in the axial direction when the screw shaft rotates, a housing in which the screw shaft and the moving member are embedded, and a guide member coupled to the housing to support the moving member and guide the axial movement of the moving member.

First, referring to FIG. 1, in the steer by wire type steering apparatus according to the present embodiments, an angle sensor 105 and a torque sensor 107 on one side of a steering shaft 103 connected to a steering wheel 101 is coupled, and the angle sensor 105 and the torque sensor 107 that detect this when the driver operates the steering wheel 101 send electrical signals to the electronic controller 110 to the steering shaft motor 120 and the pinion shaft motor 130 is activated.

The electronic controller 110 controls the steering shaft motor 120 and the pinion shaft motor 130 based on the electrical signals transmitted from the angle sensor 105 and the torque sensor 107 and the electrical signals transmitted from other sensors mounted on the vehicle.

The steering shaft motor 120 is connected to a speed reducer 135 for reducing the number of revolutions of the motor, and provides a reaction force to the steering shaft 103 so as to feel a steering reaction force in the opposite direction when the driver operates the steering wheel 101 during normal driving. And during autonomous driving, steering is performed by the control of the electronic control device 110 without the driver's will.

The pinion shaft motor 130 slides the rack bar 111 connected to the pinion shaft 113 to steer the wheels 119 on both sides through the tie rod 115 and the knuckle arm 117.

However, in the drawings in the present embodiments, for convenience of explanation, the angle sensor 105 and the torque sensor 107 are provided on the steering shaft 103 as an example, but a vehicle speed sensor and a motor position sensor for transmitting steering information to the electronic control device 110, various radars, lidar, image sensors such as a camera, etc. may be provided, and a detailed description thereof will be omitted below.

In such a steer by wire type steering apparatus, since the steering wheel 101 and the wheel 119 are not mechanically connected, when the driver manipulates the steering wheel 101, a mechanical restriction is required to stop the rotation of the steering wheel 101 at a certain angle.

That is, when the rotation of the wheel 119 reaches the maximum point (in a general steering device, when the steering wheel 101 or the wheel 119 is in a full-turn state), the rotation angle limiting member 150 for mechanically limiting the rotation angle of the steering shaft 103 is provided so that the steering wheel 101 is not rotated anymore. Thus, it provides the driver with an accurate steering feeling.

The rotation angle limiting member 150 is provided at the lower end of the steering column 100, and includes a screw shaft 140 that rotates in conjunction with the steering shaft 103, a moving member 160 that moves in the axial direction when the screw shaft 140 rotates, and a housing 180 in which the screw shaft 140 and the moving member 160 are built in and coupled to the reducer 135 provided in the lower portion of the steering column 100, and a guide member 170 for guiding the axial movement while limiting the rotation of the moving member 160.

The screw shaft 140 that is coupled with the steering shaft 103 and rotates in conjunction has an outer circumferential screw portion 141 formed on an outer circumferential surface, and a moving member 160 is coupled to the outer peripheral side of the screw shaft 140 to move in the axial direction.

The moving member 160 is coupled to the outer circumferential side of the screw shaft 140, the inner circumferential screw portion 161 screwed to the outer circumferential screw portion 141 of the screw shaft 140 on the inner circumferential surface of the moving member 160 is formed, so that when the screw shaft 140 rotates the moving member 160 moves in the axial direction while being supported by the guide member 170.

And, the housing 180 in which the moving member 160 and the screw shaft 140 and are built in is coupled to the reducer 135 provided at the lower portion of the steering column 100, and a guide member 170 supporting the moving member 160 and guiding the axial movement of the moving member 160 is coupled to the housing 180.

The moving member 160 includes a main body 162 to which the screw shaft 140 is coupled to the inner circumferential screw portion 161, and an extension portion 163 extending radially from the outer peripheral side of the main body 162 and supported by the guide member 170.

The extension portion 163 is provided as a pair on one side and the other side in the radial direction of the moving member 160, and each of the extension portions 163 is provided with a guide hole 168 through which the guide member 170 passes, so that the guide hole 168 is supported by the guide member 170 and the moving member 160 slides in the axial direction when the screw shaft 140 is rotated.

And, a seating groove 167 recessed in the axial direction is provided on one side and the other side of the extension part 163, and a guide hole 168 is penetrated inside the seating groove 167 in the radial direction.

A first support member 175a and 177a elastically supported by one side seating groove 167 of the extension portion 163 and a side partition wall 181a of the housing 180 is coupled to one side of the guide member 170, and a second support member 175b and 177b elastically supported by the other side seating groove 167 of the extension portion 163 and the other side partition wall 181b of the housing 180 is coupled to the other side of the guide member 170.

Therefore, when the moving member 160 moves to one side and the other side in the axial direction, the steering reaction force is provided to the driver by the elastic restoring force of the first support member 175a and 177a and the second support member 175b and 177b.

In particular, even if a malfunction or inability of the motor or electronic controller occurs, the first support member 175a and 177a and the second support member 175b and 177b generate a physical steering reaction force, so that the driver can safely steer.

As shown in FIGS. 3 to 9, the first support member 175a and the second support member 175b have a coil shape in which one end is supported by the seating groove 167 and the other end is supported by the housing 180.

In addition, as shown in FIG. 10, the first support member 177a and the second support member 177b are formed in a hollow shape in which one end is supported by the seating groove 167 and the other end is supported by the housing 180. The first support member 177a and the second support member 177b may have one or more radially reduced diameter concave groove 178 or radially enlarged protruding end 179 on their outer peripheral surfaces.

In addition, as shown in FIG. 11, the first support member 175a and the second support member 175b coupled to any one of the extension portion 163 have a coil shape in which one end is supported by the seating groove 167 and the other end is supported by the housing 180. And the first support member 177a and the second support member 177b coupled to the other end of the extension portion 163 have a hollow shape in which one end is supported by the seating groove 167 and the other end is supported by the housing 180, and the first support member 177a and the second support member 177b are provided with one or more radially reduced diameter concave groove 178 or radially enlarged protruding end 179 on their outer peripheral surfaces.

In FIG. 11, for example, a coil-shaped first support member 175a and a second support member 175b are provided at the upper end of the moving member 160, and the first support member 177a and the second support member 177b provided with the concave groove 178 or the protruding end 179 are provided at the lower end of the moving member 160.

A through hole 182 through which the steering shaft 103 and the screw shaft 140 pass is provided in one side partition wall 181a and the other side partition wall 181b of the housing 180 in which the screw shaft 140 and the moving member 160 are embedded, and a fixing hole 188 through which both ends of the guide member 170 are fixed through is provided on the radially outer side of the through hole 182, so that both ends of the guide member 170 are coupled and fixed.

Here, the fixing holes 188 may be provided in pairs at symmetrical positions on one side and the other side with respect to the central axis of the housing 180, that is, at positions corresponding to the guide hole 168 of the moving member 160, and the guide member 170 may be coupled to each of the fixing holes 188.

A connection wall 183 connecting one side partition wall 181a and the other side partition wall 181b is provided to the housing 180, and a space between the one side partition wall 181a provided with the fixing hole 188 and the other side partition wall 181b is formed to be vertically opened, so that assembly and operation of the screw shaft 140, the moving member 160, and the guide member 170 are possible.

In addition, a fastening flange 185 having a fastening hole 186 is provided to the connecting wall 183 connecting the one side partition wall 181a and the other side partition wall 181b of the housing 180. Therefore the fastening flange 185 is coupled to the housing of the reducer 135 provided under the steering column 100.

On one side and the other side of the moving member 160, stopping protrusions 165a and 165b are provided in which protruding in the axial direction between the main body 162 and the extension portion 163.

And, a shaft stopping member 150a and 150b provided with a support protrusion 151 supported by the stopping protrusions 165a and 165b of the moving member 160 are coupled to one end and the other end of the screw shaft 140. Accordingly, when the screw shaft 140 is rotated, the moving member 160 moves to one side and the other side while the stopping protrusions 165a and 165b are supported by the support protrusion 151 to stop the movement.

In addition, a first anti-rotation portion 145 formed as a flat surface or a curved surface formed with a radius of curvature different from the radius of curvature of the outer circumference of the screw shaft 140 is provided at one end and the other end of the screw shaft 140.

A second anti-rotation portion 155 is provided on an inner circumferential surface of the shaft stopping member 150a and 150b to have a shape corresponding to the first anti-rotation portion 145 and coupled to the first anti-rotation portion 145. Thus, when the screw shaft 140 is rotated, the shaft stopping member 150a and 150b is interlocked and rotated without being dislocated.

However, in the drawings of the present embodiments, the first anti-rotation portion 145 and the second anti-rotation portion 155 are illustrated as being flat.

The steering shaft 103 includes an output shaft 112 connected to the input shaft 111, the screw shaft 140 is coupled to an outer peripheral surface of the output shaft 112 and the input shaft 111 and the output shaft 112 are coupled via a torsion bar 106.

Serrations 112a and 143 corresponding to each other are provided on the outer circumferential surface of the output shaft 112 and the inner circumferential surface of the screw shaft 140, so that the output shaft 112 and the screw shaft 140 are interlocked and rotated when the steering shaft 103 rotates without being dislocated.

A bearing 121 for supporting the rotation of the output shaft 112 is coupled between the outer peripheral surface of the output shaft 112 and the inner peripheral surface of the housing of the reducer 135, and a stepped portion 112b for supporting one end of the screw shaft 140 in the axial direction is provided on the outer peripheral surface of the output shaft 112.

In addition, a fixing member 195 for supporting the other end of the screw shaft 140 in the axial direction is coupled to the end of the output shaft 112 to support the screw shaft 140 in the axial direction to prevent separation.

As described above, according to the present embodiments, the present embodiments may provide a steer by wire type steering apparatus capable of increasing a driver's steering feel and steering stability by preventing the steering wheel from mechanically rotating any more when the rotation of the wheel reaches the maximum point.

In addition, the present embodiments may provide a steer by wire type steering apparatus capable of increasing a driver's steering feel and steering stability by generating a physical steering reaction force even when a malfunction or inability of a motor or electronic controller occurs.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steer by wire steering apparatus, comprising:
   a screw shaft having an outer circumferential screw portion provided on an outer circumferential surface and rotating in conjunction with a steering shaft;
   a moving member coupled to an outer circumferential side of the screw shaft and having an inner circumferential screw portion screw-coupled to the outer circumferential screw portion formed on the inner circumferential surface and moving in the axial direction when the screw shaft rotates;
   a housing in which the screw shaft and the moving member are embedded; and
   a guide member coupled to the housing to support the moving member and guide the axial movement of the moving member,
   wherein the steering shaft includes an output shaft, and the screw shaft is coupled to an outer circumferential surface of the output shaft.

2. The steer by wire steering apparatus of claim 1, wherein the moving member includes a main body to which the screw shaft is coupled, and an extension portion extending radially from an outer peripheral side of the main body and supported by the guide member.

3. The steer by wire steering apparatus of claim 2, wherein the extension portion comprises a pair of extension portions on one side and another side of the moving member extending in the radial direction, and each of the extension portions is provided with a guide hole through which the guide member is supported.

4. The steer by wire steering apparatus of claim 1, wherein the output shaft of the steering shaft is connected to an input shaft.

5. The steer by wire type-steering apparatus of claim 4, wherein serrations corresponding to each other are provided on the outer circumferential surface of the output shaft and the inner circumferential surface of the screw shaft, so that the output shaft and the screw shaft are interlocked and rotated when the steering shaft rotates.

6. The steer by wire steering apparatus of claim 4, wherein a bearing for supporting rotation of the output shaft is coupled between the outer peripheral surface of the output shaft and the inner peripheral surface of the housing of a reducer.

7. The steer by wire steering apparatus of claim 4, wherein a stepped portion for supporting one end of the screw shaft in the axial direction is provided on the outer peripheral surface of the output shaft.

8. The steer by wire steering apparatus of claim 7, wherein a fixing member for supporting the other end of the screw shaft in the axial direction is coupled to an end of the output shaft.

9. A steer by wire steering apparatus, comprising:
   a screw shaft having an outer circumferential screw portion provided on an outer circumferential surface and rotating in conjunction with a steering shaft;
   a moving member coupled to an outer circumferential side of the screw shaft and having an inner circumferential screw portion screw-coupled to the outer circumferential screw portion formed on the inner circumferential surface and moving in the axial direction when the screw shaft rotates;
   a housing in which the screw shaft and the moving member are embedded; and
   a guide member coupled to the housing to support the moving member and guide the axial movement of the moving member,
   wherein the moving member includes a main body to which the screw shaft is coupled, and an extension portion extending radially from an outer peripheral side of the main body and supported by the guide member,
   wherein the extension portion comprises a pair of extension portions on one side and another side of the moving member extending in the radial direction, and each of the extension portions is provided with a guide hole through which the guide member is supported, and
   wherein a first support member elastically supported by one of the extension portions and a partition wall on one side of the housing is coupled to one side of the guide member, and a second support member elastically supported by another of the extension portions and the partition wall on the other side of the housing is coupled to the other side of the guide member.

10. The steer by wire steering apparatus of claim 9, wherein a seating groove recessed in the axial direction to support the first support member and the second support member are provided on one side and the other side of the extension, and the guide hole is provided to pass through the inner side of the seating groove in the radial direction.

11. The steer by wire type-steering apparatus of claim 10, wherein the first support member and the second support member have a coil shape in which one end is supported by the seating groove and the other end is supported by the housing.

12. The steer by wire type-steering apparatus of claim 10, wherein the first support member and the second support member are formed in a hollow shape in which one end is supported by the seating groove and the other end is supported by the housing, and the first support member and the second support member are provided with at least one radially reduced diameter concave groove or a radially enlarged protruding end on the outer peripheral surface.

13. The steer by wire steering apparatus of claim 10, wherein the first support member and the second support member coupled to any one of the extension portion have a coil shape in which one end is supported in the seating groove and the other end is supported in the housing, and the first support member and the second support member coupled to the other end of the extension portion have a hollow shape in which one end is supported in the seating groove and the other end is supported in the housing, and the first support member and the second support member are provided with at least one radially reduced diameter concave groove or a radially enlarged protruding end on the outer peripheral surface.

14. The steer by wire steering apparatus of claim 10, wherein a through hole through which the steering shaft and the screw shaft pass is provided in one partition wall and the other partition wall of the housing, and a fixing hole through which both ends of the guide member are fixed through is provided on the radially outer side of the through hole.

15. The steer by wire steering apparatus of claim 14, wherein the fixing holes are provided in pairs at symmetrical positions on one side and the other side with respect to the central axis of the housing, and the guide member is coupled to each of the fixing holes.

16. The steer by wire steering apparatus of claim 14, wherein a connection wall connecting the one side partition wall and the other side partition wall is provided in the housing and a space between the one side partition wall provided with the fixing hole and the other side partition wall is formed to be vertically opened.

17. The steer by wire steering apparatus of claim 14, wherein a connection wall connecting the one side partition wall and the other side partition wall is provided in the housing, and a fastening flange having a fastening hole coupled to the steering column is provided on the connecting wall.

18. A steer by wire steering apparatus, comprising:
a screw shaft having an outer circumferential screw portion provided on an outer circumferential surface and rotating in conjunction with a steering shaft;
a moving member coupled to an outer circumferential side of the screw shaft and having an inner circumferential screw portion screw-coupled to the outer circumferential screw portion formed on the inner circumferential surface and moving in the axial direction when the screw shaft rotates;
a housing in which the screw shaft and the moving member are embedded; and
a guide member coupled to the housing to support the moving member and guide the axial movement of the moving member,
wherein the moving member includes a main body to which the screw shaft is coupled, and an extension portion extending radially from an outer peripheral side of the main body and supported by the guide member, and
wherein stopping protrusions protruding in the axial direction between the main body and the extension portion are provided on one side and another side of the moving member, and a shaft stopping member provided with a support protrusion supported by the stopping protrusions are coupled to one end and another end of the screw shaft.

19. The steer by wire steering apparatus of claim 18, wherein a first anti-rotation portion formed as a flat surface or a curved surface formed with a radius of curvature different from the radius of curvature of the outer circumferential surface of the screw shaft is provided at one end and the other end of the screw shaft.

20. The steer by wire steering apparatus of claim 19, wherein a second anti-rotation portion is provided on an inner circumferential surface of the shaft stopping member to have a shape corresponding to the first anti-rotation portion and is coupled to the first anti-rotation portion.

* * * * *